(No Model.)
C. B. BANDER.
CORN SHELLER.
No. 459,953. Patented Sept. 22, 1891.
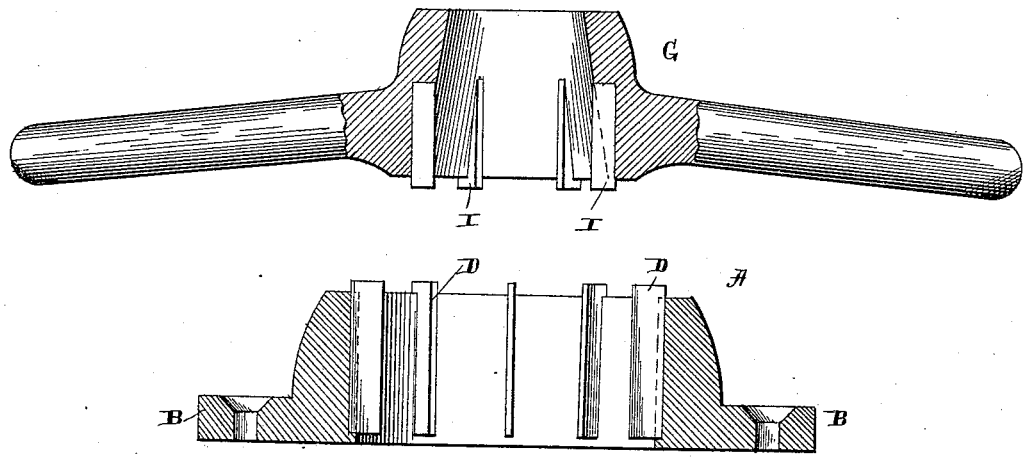
WITNESSES
Geo E Frech
Roland G Fitzgerald
INVENTOR
C. B. Bander,
per
Lehmann & Pattison,
Attys.

UNITED STATES PATENT OFFICE.

CHARLES BORNET BANDER, OF REAGAN, TEXAS.

CORN-SHELLER.

SPECIFICATION forming part of Letters Patent No. 459,953, dated September 22, 1891.

Application filed May 14, 1891. Serial No. 392,753. (No model.)

*To all whom it may concern:*

Be it known that I, CHARLES BORNET BANDER, of Reagan, in the county of Falls and State of Texas, have invented certain new and useful Improvements in Corn-Shellers; and I do hereby declare the following to be a full, clear, and exact description of the invention, such as will enable others skilled in the art to which it pertains to make and use it, reference being had to the accompanying drawing, which forms part of this specification.

My invention relates to an improvement in corn-shellers; and it consists in a perforated casting provided with radial teeth or projections which extend toward its center and which is to be secured to a support having an opening through it, combined with a double-ended handle which has an opening through its center and teeth projecting from the opening, as will be more fully described hereinafter.

The object of my invention is to provide a corn-sheller which consists of only two parts and by means of which ears of corn can be quickly and easily shelled, and which parts are cheap and simple in construction and will last indefinitely.

The accompanying drawing represents a vertical section of a sheller which embodies my invention.

A represents a suitable metallic casting, which has an opening through its center sufficiently large to allow a corn-cob to pass through and which is to be screwed or fastened to a board or other support which is placed across the top of a barrel, tub, box, or other receptacle into which the corn is to be shelled. Ears B are formed upon opposite sides of this casting and through which screws are passed; but I do not limit myself to any particular construction in this respect. Formed upon the inner side of this casting are the radial teeth D, which project at their upper ends a suitable distance above the top of the casting and which extend nearly to its lower edge. These teeth consist of flat pieces which extend inwardly any desired distance and serve as the ear of corn is revolved to loosen the grains. Used in connection with this casting A is a double-ended casting G, which is made largest at its center and through which center is made an opening sufficiently large to allow the small end of the ear of corn to be inserted therein. This casting is also provided with radial teeth I, which project a slight distance below its lower edge, and which teeth serve to take a hold upon the cob, so that when the handle is turned around it will cause the ear of corn to revolve with it, and thus bring the grains in contact with the teeth upon the lower casting and cause them to be shelled off. Either the cob may be forced through the lower casting or it may be withdrawn before it is forced entirely through and the grains adhering to the small end of the cob shelled off by turning it around in the handle.

As the two pieces which constitute the sheller are made of some durable material, it will be readily seen that they are not liable to wear out or get out of order while in use, that they are cheap and simple, and can be used by any one without any previous experience being required.

Having thus described my invention, I claim—

In a corn-sheller, the base portion provided with a central opening, ribs secured in the wall of the said opening, which project above the top of the base portion, a revolving ear-grasping portion having a tapering central opening, ribs secured in and at an angle to the wall of the said opening and which project below the base of the said revolving portion, the parts being combined substantially as shown and described.

In testimony whereof I affix my signature in presence of two witnesses.

CHARLES BORNET BANDER.

Witnesses:
 BEN. F. SIKES,
 R. SMITH.